No. 796,143. PATENTED AUG. 1, 1905.
A. NORD.
LINE GRIP HOLDER.
APPLICATION FILED JAN. 30, 1905.

Witnesses
P. M. Offutt
C. W. Fowler

Inventor
Alexander Nord
by George H. Strong
his Attorney

UNITED STATES PATENT OFFICE.

ALEXANDER NORD, OF SAN FRANCISCO, CALIFORNIA.

LINE-GRIP HOLDER.

No. 796,143. Specification of Letters Patent. Patented Aug. 1, 1905.

Application filed January 30, 1905. Serial No. 243,311.

*To all whom it may concern:*

Be it known that I, ALEXANDER NORD, a citizen of the United States, residing in the city and county of San Francisco and State of California, have invented new and useful Improvements in Line-Grip Holders, of which the following is a specification.

My invention relates to a device for holding clothes-lines, and generally lines of any kind which it is desired to secure so as to be easily drawn taut or readily released.

It consists in details of construction and combinations of parts, which will be more fully explained by reference to the accompanying drawings, in which—

Figure 1:
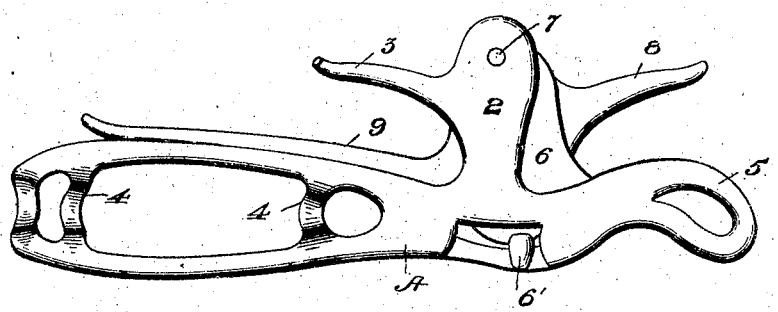
Figure 2:
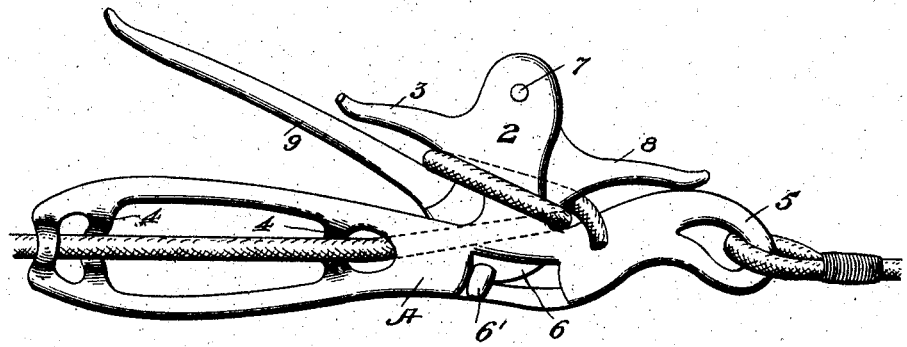

Figure 1 is a perspective view of my invention in open position. Fig. 2 is a view showing application of line and in closed position.

As shown in the drawings, A is the main portion or support of the device, which may be cast in malleable or other metal, having a portion projecting at substantially right angles from one side, as shown at 2, and this portion again has an arm projecting from one side, as shown at 3, and at a distance from the main portion A. The portion A may be made open for lightness, as shown, and at one end it has transverse bars forming guides or loops, as shown at 4, through which the line may be passed, as will be hereinafter described. The opposite end of the part A has a loop formed in it, as at 5.

6 is a plate fitted to and movable with relation to the part 2, to which it is pivoted, as shown at 7, and this part 6 has an outwardly-projecting arm, as at 8, this arm projecting to the opposite side from the arm 3 of the part 2. The plate has also a projection or stop 6' operating in a slot in the body portion to limit the amount of swing of said plate.

The operation will then be as follows: If used for a clothes-line, one end of the line may be permanently fixed in the loop 5. Passing thence around a pulley upon the support at that end, thence returning across the open space covered by the line around another pulley, it is brought back to the opposite end of this device and, passing through the loops or guides 4, it is given one or more turns.

The device may be used in any position where lines are to be secured. Thus having the end 5 attached to some point the line may be brought into the loops or guides 4, and thence with a turn or two around the part 6 and within the arms 3 and 8 the tension of the line will swing the part 6 so that the arm 8 grips the line upon that side, while the upward movement of the lever-arm 9 provides a similar grip between itself and the fixed arm 3.

As the part 6 is adapted to swing over a limited space, it will be seen that any pull upon the line around this part inside of the arm 8 will swing the part 6 about its pivot-pin 7, and thus cause the arm 8 to compress the line between itself and the corresponding part of the portion A, where it will be firmly locked.

The part 6 has a lever-arm 9 projecting from the side opposite to the arm 8, and this lever-arm extends substantially coincident with one side of that portion of the part A, and when the line is fast, as previously described, this arm 9 is swung upwardly, as shown in Fig. 2.

When it is desired to disengage the line, it is only necessary to press down upon the lever-arm, thus swinging the part 6 about its pivot-pin and raising the arm 8 to disengage the line upon that side, while at the same time the pressing down of the lever-arm disengages it from the grip which holds it between the parts 9 and 3.

Having thus described my invention, what I claim, and desire to secure by Letters Patent, is—

1. A line-grip holder comprising a body having a projection from one side at a point intermediate of the ends, said projection having an extending arm, and a movable member pivoted at the outer end of the projection and having an arm which normally lies substantially parallel with the corresponding portion of the body and with the first-named arm, between which arms the rope is adapted to be gripped.

2. A line-grip holder consisting of a body with means for attaching one end, guides through which a line may be introduced at the opposite end, a projection from one side of said body, a movable portion pivoted at the outer end of the projection and having an arm extending from one side substantially parallel with the corresponding portion of the body, a lever-arm projecting from the opposite side and a fixed arm between which and the lever-arm the rope may be gripped.

3. In a line-grip holder, a body portion having a projection from one side, and an arm projecting rigidly therefrom, a means for attaching the device at one end, guides for the line in the opposite end, a second portion pivoted to the outer end of the projection of the first portion having an arm projecting from one side, and a lever-arm from the opposite side, said arms and lever-arm serving to grip turns of the line which are made between the movable and fixed portions.

In testimony whereof I have hereunto set my hand in presence of two subscribing witnesses.

ALEXANDER NORD.

Witnesses:
S. H. NOURSE,
HENRY P. TRICOU.